United States Patent
Howell et al.

(10) Patent No.: US 12,103,668 B2
(45) Date of Patent: Oct. 1, 2024

(54) AIRCRAFT SYSTEM

(71) Applicant: Airbus Operations Limited, Bristol (GB)

(72) Inventors: George Howell, Bristol (GB); Ashley Bidmead, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 17/720,893

(22) Filed: Apr. 14, 2022

(65) Prior Publication Data

US 2022/0332408 A1 Oct. 20, 2022

(30) Foreign Application Priority Data

Apr. 15, 2021 (GB) .................................... 2105406

(51) Int. Cl.
G06F 7/70 (2006.01)
B64C 25/42 (2006.01)

(52) U.S. Cl.
CPC ................... B64C 25/426 (2013.01)

(58) Field of Classification Search
CPC ... B64C 25/426; B64C 25/42; B60T 2270/86; B60T 8/00; B60T 17/221; B60T 8/1703; G06F 7/70
USPC .......................................................... 701/70
See application file for complete search history.

(56) References Cited

U.S. PATENT DOCUMENTS

| | | | | |
|---|---|---|---|---|
| 2008/0195301 A1* | 8/2008 | Fabre | ................... | G08G 5/0021 701/120 |
| 2012/0259500 A1* | 10/2012 | DeVlieg | ................. | B60T 8/325 701/29.4 |
| 2014/0257603 A1* | 9/2014 | McKeown | ........... | G08G 5/0021 701/16 |
| 2015/0005982 A1* | 1/2015 | Muthukumar | ........ | B60T 8/1725 701/1 |
| 2020/0168108 A1* | 5/2020 | Letsu-Dake | ......... | G08G 5/0013 |
| 2021/0001823 A1* | 1/2021 | Georgin | ................ | B60T 8/1703 |

(Continued)

FOREIGN PATENT DOCUMENTS

| | | |
|---|---|---|
| CN | 105043776 | 11/2015 |
| CN | 106228500 | 12/2016 |
| CN | 107797543 | 3/2018 |

(Continued)

OTHER PUBLICATIONS

Combined Search and Examination Report for GB2105406.9, dated Jan. 21, 2022, 10 pages.

*Primary Examiner* — Shardul D Patel
(74) *Attorney, Agent, or Firm* — Nixon & Vanderhye P.C.

(57) ABSTRACT

An aircraft system having a first set of components for performing a function of the aircraft system, and a second, alternative, set of components for performing the function of the aircraft system. The aircraft system has and a controller configured to receive scenario data indicative of a scenario during which the function of the aircraft system is to be performed, and, where each of the first and second sets of components are operational, the controller is configured to select between the first or the second set of components to perform the aircraft system function during the scenario based on the received scenario data. The controller is configured to control the selected set of components to perform the function during the scenario.

17 Claims, 3 Drawing Sheets

(56) References Cited

U.S. PATENT DOCUMENTS

2021/0109547 A1* 4/2021 Clark .................. G05D 1/0816

FOREIGN PATENT DOCUMENTS

| CN | 110362064 | 10/2019 |
| CN | 110427988 | 11/2019 |
| EP | 1 323 605 | 7/2003 |
| EP | 3 760 504 | 1/2021 |

* cited by examiner

AIRCRAFT SYSTEM

RELATED APPLICATION

This application incorporates by reference and claims priority to United Kingdom patent application GB 2105406.9, filed Apr. 15, 2021.

TECHNICAL FIELD

The present invention relates to an aircraft system.

BACKGROUND

Aircraft systems typically comprise many components, making up primary, secondary and even tertiary sets of components to ensure continuity of performance of the aircraft system if performance of one or more components is impaired.

SUMMARY

A first aspect of the present invention provides an aircraft system comprising a first set of components for performing a function of the aircraft system, a second, alternative, set of components for performing the function of the aircraft system, and a controller configured to: receive scenario data indicative of a scenario during which the function of the aircraft system is to be performed; where each of the first and second sets of components are operational, select between the first or the second set of components to perform the aircraft system function during the scenario based on the received scenario data; and control the selected set of components to perform the function during the scenario.

The aircraft system according to the first aspect of the present invention may be advantageous as the controller is configured to, where each of the first and second sets of components are operational, select between the first and second sets to perform the aircraft system function during the scenario based on the received scenario data.

In particular, in known aircraft systems having first and second sets of components that perform the same aircraft system function, for example a primary set of components and a secondary or backup set of components, one of the first and second sets of components is used during normal operating conditions, with the other of the second and first sets of components being used only where the set of components used during normal operating scenarios is non-operational, for example due to a component fault. Conventional aircraft systems may thereby provide at least one level of redundancy to account for scenarios that are outside of normal operating conditions. However, it may be the case that performance of the set of components used in normal operating conditions is not tailored to the particular scenario in which the function of the aircraft system is to be performed. The present invention mitigates for this by selecting between the first or the second set of components to perform the aircraft system function during the scenario based on the received scenario data. This may allow for the function of the aircraft system to be performed in a manner that is tailored to a particular scenario, by using the most appropriate set of components based on the received scenario data.

Operational as discussed herein is taken to mean that a particular set of components can be operated to perform the desired function of the aircraft system, for example with a set of components being considered operational only where each component of that set is operational.

The scenario data may comprise component data indicative of a state of components in the first and second sets of components, for example a state of components in the first and second sets of components pre-the scenario in which the function of the aircraft system is to be performed. This may enable selection between the first and second sets of components to perform the aircraft system function to be based on the state of components within the first and second sets of components. The controller may be configured to receive component data indicative of a state of components in the first and second sets of components. The scenario data may comprise component data indicative of a state of each of the components in the first and second sets of components. This may enable the state of each component of the first and second sets of components to be taken into account when selecting which of the first and second sets of components is to be used to perform the function of the aircraft system.

The scenario data may comprise component data indicative of a future state of components in the first and second sets of components, for example a predicted state of components in the first and second sets of components post-the scenario in which the function of the aircraft system is to be performed. This may, for example, enable the controller to determine which of the first and second sets of components to use to perform the function to avoid negatively impacting upon the future state of components in the first and second sets of components.

The component data may be indicative of any of component service life, component wear, or component performance capability.

Component service life may comprise any of a duration since component installation or manufacture, a number of previous component uses, and an estimated duration of remaining component lifespan. This may enable component service life to be taken into account when selecting which of the first and second sets of components to perform the function during a particular scenario. For example, a duration since component installation or manufacture, or a number of previous component uses, may be indicative of component wear based on a simulation of component wear during normal operating conditions. By selecting one of the first and second sets of components based on received component data indicative of a duration since component installation or manufacture, component wear may be taken into account when considering whether to perform the function of the aircraft system using the first or second sets of components. Similarly, by selecting one of the first and second sets of components based on received component data indicative of an estimated duration of remaining component lifespan, a lifespan of components may be prolonged by selecting a set of components that has a longer remaining component lifespan to perform the function.

The controller may be configured to compare any of a duration since component installation or manufacture, a number of previous component uses, and an estimated duration of remaining component lifespan, between corresponding components of the first and second sets of components, and to select between the first or the second set of components to perform the aircraft system function during the scenario based on the comparison. For example, where corresponding components in the first and second set of components have different durations since installation, the controller may be configured to select the set of components having the shortest time since installation to perform the aircraft system function.

By corresponding components is meant components within the first and second sets of components that contribute similar functionality to the overall function of the aircraft system.

The controller may be configured to derive an estimated remaining lifespan of the first and second sets of components, and to select between the first or the second set of components to perform the aircraft system function during the scenario based on the derived remaining lifespan.

Components that suffer excessive wear in normal operating conditions may require regular maintenance. By selecting one of the first and second sets of components based on received component data indicative of component wear, maintenance intervals may be increased. The controller may be configured to compare component wear between corresponding components of the first and second sets of components, and to select between the first or the second set of components to perform the aircraft system function during the scenario based on the comparison. For example, where corresponding components in the first and second sets of components have different levels of component wear, the controller may be configured to select the set of components having the lowest level of component wear to perform the aircraft system function. The controller may be configured to calculate an aggregate level of component wear for each of the first and second sets of components, and to select the set of components having the lowest aggregate level of component wear to perform the aircraft system function.

By selecting one of the first and second sets of components based on received component data indicative of component performance capability, one of the first and second sets of components may be chosen depending on a desired performance criteria for the aircraft system function in the particular scenario in which the function is to be performed. The controller may be configured to compare performance capability between corresponding components of the first and second sets of components, and to select between the first or the second set of components to perform the aircraft system function during the scenario based on the comparison. For example, where corresponding components in the first and second sets of components have different levels of performance capability, the controller may be configured to select the set of components having the higher or lower level of performance capability, as desired, to perform the aircraft system function. The controller may be configured to calculate an aggregate level of performance capability for each of the first and second sets of components, and to select the set of components having the higher or lower aggregate level of performance capability, as desired for the particular scenario, to perform the aircraft system function.

It will be appreciated that performance capability may be at least partly based on component wear and/or component service life, and that component wear may be at least partly based on component service life.

The scenario data may comprise data indicative of any of an aircraft condition, a runway condition, or ambient weather condition, during the scenario. Thus the controller may account for any of an aircraft condition, a runway condition, or ambient weather condition when selecting between the first and second sets of components to perform the aircraft system function during the scenario.

The aircraft system may comprise an aircraft braking system, for example a system for applying a braking force to a wheel of an aircraft. The function may comprise applying a braking force to a wheel of an aircraft.

The aircraft condition may be indicative of any of a weight of the aircraft, landing gear loading during take-off or landing, wheel loading during take-off or landing, aircraft engine thrust magnitude, aircraft engine thrust direction, a flight control surface configuration, tyre condition, tyre pressure, or tyre lifespan. Each of these factors may contribute to the braking force to be applied to a wheel of an aircraft, and by selecting between the first and second sets of components based on any of these factors, an appropriate set of components may be selected for the given factors.

The runway condition may be indicative of any of runway distance or a coefficient of friction of the runway. Runway distance and/or a coefficient of friction of a runway may influence a braking force required to be applied during landing of an aircraft. By selecting between the first and second sets of components based on any of runway distance and a coefficient of friction of the runway, an appropriate one of the first and second sets of components may be chosen to perform the function, for example to apply a braking force to a wheel of an aircraft.

The scenario data may be derived from a model of the aircraft system.

The aircraft system may comprise a sensor, and the scenario data may be derived from a reading taken by the sensor in use. This may enable the controller to select between the first and second sets of components based on real-time data. The sensor may, for example, monitor a performance capability of one or more components of the first and second sets of components. The aircraft system may comprise a plurality of sensors, for example a plurality of sensors configured to monitor a plurality of corresponding components of the first and second sets of components.

The aircraft system may comprise a memory, and the scenario data may be derived from simulation data stored in the memory.

The controller may be configured to receive the scenario data from an off-aircraft location. This may remove the need for the aircraft system to comprise a large memory.

The first and second sets of components may comprise mutually exclusive sets, for example such that none of the components in the first set of components are present in the second set of components, and vice versa.

The controller may comprise a machine learning model to select between the first or the second set of components based on the received scenario data. For example, the machine learning model may receive the scenario data as an input, and determine which of the first and second sets of components to select as an output. A machine learning model may be able to adapt to a wide range of scenarios seen by the aircraft system in use. The machine learning model may comprise a neural network or the like.

The aircraft system may comprise a third, different, set of components for performing the function of the aircraft system, and controller is configured to, where the first, second and third sets of components are operational, select between the first, second and third sets of components to perform the aircraft system function during the scenario based on the received scenario data, and control the selected set of components to perform the function during the scenario. This may provide further flexibility in determining which components are to be used for a given scenario.

Where one of the first and second sets of components is non-operational, the controller may be configured to select the other of the second and first sets of components to perform the aircraft system function.

A second aspect of the present invention provides a controller for an aircraft system comprising a first set of components for performing a function of the aircraft system, and a second, alternative, set of components for performing the function of the aircraft system, the controller configured to: receive scenario data indicative of a scenario during which the function of the aircraft system is to be performed; where each of the first and second sets of components are operational, select between the first or the second set of components to perform the aircraft system function during the scenario based on the received scenario data; and control the selected set of components to perform the function during the scenario.

A third aspect of the present invention provides an aircraft comprising an aircraft system according to any one of the preceding claims.

A fourth aspect of the present invention provides a method of performing a function of an aircraft system comprising a first set of components for performing the function and a second, alternative, set of components for performing the function, wherein the method comprises; receiving scenario data indicative of a scenario during which the function of the aircraft system is to be performed; where each of the first and second sets of components are operational, selecting between the first and second sets of components to perform the aircraft system function during the scenario based on the received scenario criteria; and controlling the selected set of components to perform the function during the scenario.

A fifth aspect of the present invention provides an aircraft braking system comprising a first set of components for performing a braking function, a second, alternative, set of components for performing the braking function, and a controller configured to: receive braking scenario data indicative of a braking scenario in which the braking function is to be performed; where each of the first and second sets of components are operational, select between the first and second sets of components to perform the braking function during the braking scenario based on the received braking scenario data; and control the selected set of components to perform the braking function during the braking scenario.

BRIEF DESCRIPTION OF THE DRAWINGS

Embodiments of the invention will now be described, by way of example only, with reference to the accompanying drawings, in which.

DETAILED DESCRIPTION

Figure 1:
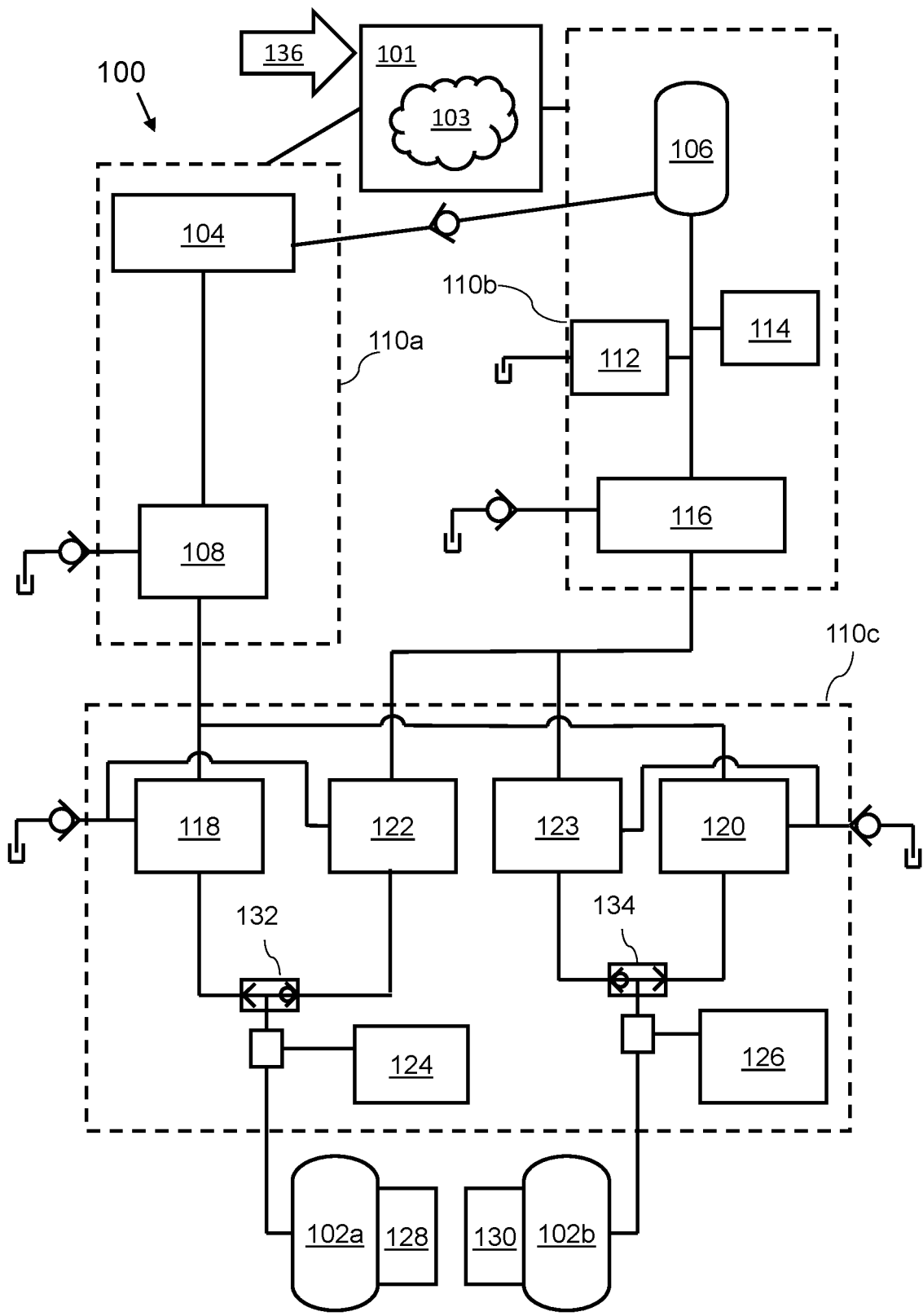
FIG. 1 is an illustration of a hydraulic braking system according to the present invention.

An aircraft system 100, in the form of a hydraulic braking system 100, according to the present invention, is illustrated schematically in FIG. 1. The braking system 100 comprises a brake controller 101, with the brake controller 101 including a neural network 103.

The hydraulic braking system 100 shown in FIG. 1 comprises components which are operated in order to control brakes 102a, 102b. The brakes 102a and 102b can be operated either using a first power supply or a second, alternative, power supply. In this example, the first power supply is provided by a hydraulic pump 104, and the second power supply is provided by a hydraulic accumulator 106. In some examples, as in the example of FIG. 1, the hydraulic pump 104 can be used to supply power to the hydraulic accumulator 106, if needed, with a check valve preventing backflow from the accumulator 106 to the hydraulic pump 104. A first selector valve 108 selects operation using the first power supply 104. Collectively, the first power supply 104 and the first selector valve 108 may be thought of as a first set of components 110a for providing a braking function of the hydraulic braking system 100. The first set of components 110a may also comprise other components including monitoring equipment (not shown). Operating the first selector valve 108 comprises providing an electrical signal to a coil which actuates the valve. The first selector valve 108 may comprise two such coils for redundancy purposes.

The hydraulic accumulator 106 is a pressurised container. When used to operate the brakes 102a and 102b, the pressure which is delivered to the rest of the braking system from the accumulator 106 is monitored and controlled to ensure the safe operation of the brakes 102a and 102b. A relief valve 112 controls the pressure of fluid released from the accumulator 106, a pressure transducer 114 monitors the pressure from the hydraulic accumulator 106, and a second selector valve 116 selects the hydraulic accumulator 106 as the power supply for operating the brakes 102a and 102b. Collectively the hydraulic accumulator 106, the relief valve 112, the pressure transducer 114, and the second selector valve 116 may be thought of as a second set of components 110b for providing a braking function of the hydraulic braking system 100.

After the operation of either the first selector valve 108 or the second selector valve 116, power, in the form of pressurised fluid, is provided in a brake operation system 110c. A first servo valve 118 and a second servo valve 120 are used to control the supply of hydraulic fluid from the hydraulic pump 104 to the first 102a and second 102b brakes respectively. The first 118 and second 120 servo valves may be considered part of the first set of components 110a, although this is not illustrated by the dashed box in FIG. 1 for the sake of clarity. A third servo valve 122 and a fourth servo valve 123 are used to control the supply of hydraulic fluid provided by the accumulator 106 to the first 102a and second 102b brakes. The third 122 and fourth 123 servo valves may be considered part of the second set of components 110b, although this is not illustrated by the dashed box in FIG. 1 for the sake of clarity. The hydraulic braking system 100 comprises two pressure transducers 124 and 126 for monitoring the pressure of hydraulic fluid being provided to each of the brakes 102a and 102b.

Shuttle valves 132, 134 are included between the first 118, second 120, third 122 and fourth 123 servo valves and the brakes 102a, 102b to ensure that the highest-pressure input is fed through to the brakes. The use of shuttle valves prevents the pressurised fluid from the accumulator 106 from being fed back into the primary power supply, and vice versa. In other words, these shuttle valves ensure that fluid delivered from the accumulator goes to the brakes and not backwards through the first 118 and second 120 servo valves.

Two tachometers 128 and 130 are used to monitor the speed of the wheels during braking to provide feedback in the braking control system. It will be appreciated that other components not shown may also be included and used in the hydraulic braking system 100, such as further sensors, actuators, and the like. It is also to be understood that while specific examples of equipment have been described herein, other equipment may also be used. For example, a wheel speed sensor other than a tachometer may be used to monitor the speed of the wheels during braking. Similarly, other pressure sensors rather than pressure transducers may be used to monitor the pressure in the hydraulic braking system 100.

As indicated above, either the first set of components 110*a* or the second set of components 110*b* can be utilised to provide a braking function of the hydraulic braking system 100. In known aircraft systems, the first set of components 110*a* would be used under normal operating conditions, with the second set of components 110*b* only being used in the event that the first set of components 110*a* is considered non-operational, for example where one or more of the components of the first set of components 110*a* is considered non-operational. Whilst the hydraulic braking system 100 of the present invention provides such functionality, the hydraulic braking system 100 also enables selection between the first set of components 110*a* and the second set of components 110*b* where both sets of components 110*a* and 110*b* are considered operational, as will be described hereafter.

In particular, the applicant has found that during certain scenarios encountered by the hydraulic braking system 100 in use, it may be preferable to use the second set of components 110*b* even where the first set of components 110*a* is considered operational. The hydraulic braking system 100 therefore accounts for this by receiving so-called "scenario data" 136 at the brake controller 101, with the brake controller 101, and in particular the neural network 103, utilising the scenario data 136 to select between the first 110*a* and second 110*b* sets of components to perform a braking function during a particular scenario. It will be appreciated that the scenario data 136 may be considered to be any data representative of an aspect of a scenario in which a braking function of the hydraulic braking system 100 is to be performed, and that examples of appropriate scenario data 136 will be described hereinafter.

Figure 2:
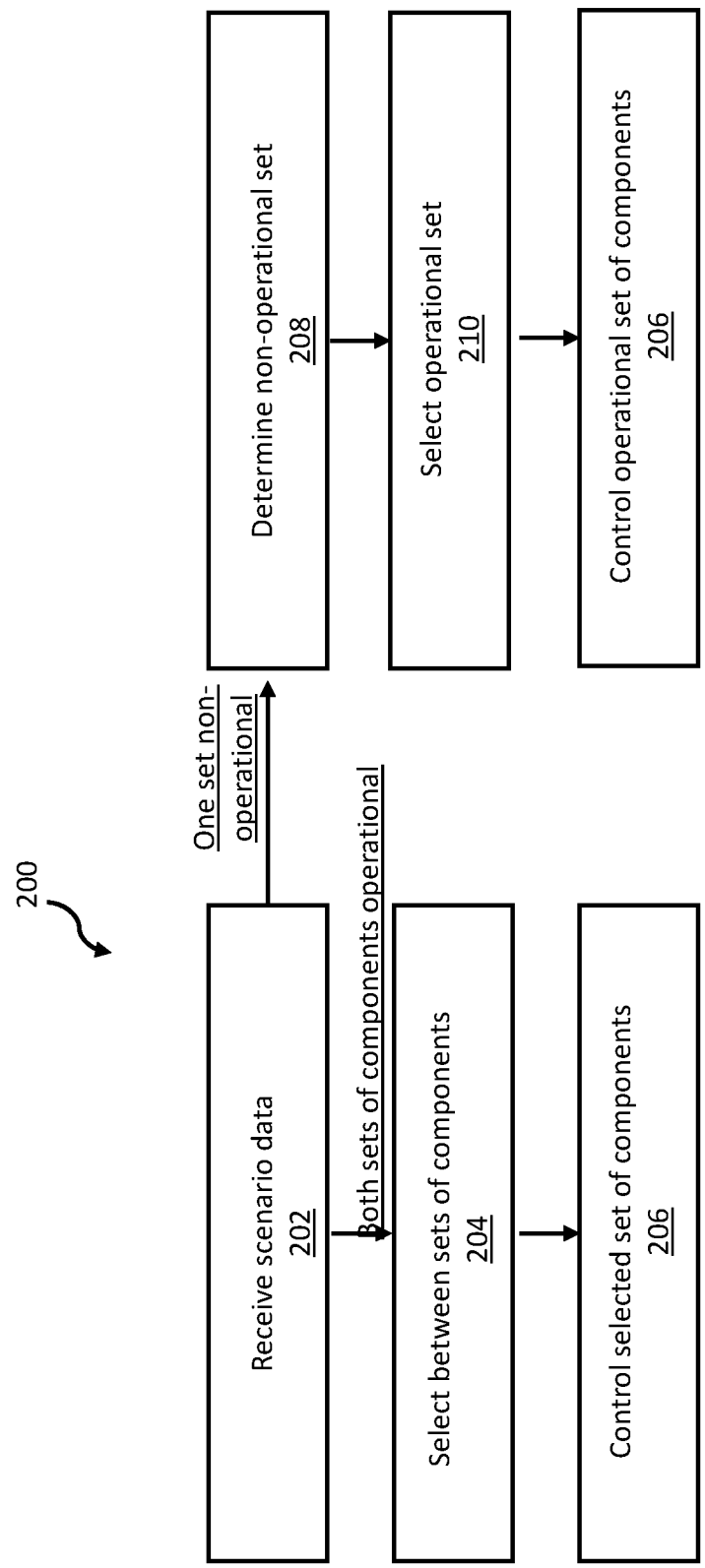
FIG. 2 is a flow chart illustrating a method according to the present invention.

A method 200 according to the present invention is illustrated schematically in FIG. 2. The method 200 comprises receiving 202 scenario data indicative of a scenario during which the braking function of the hydraulic braking system 100 is to be performed. Where each of the first 110*a* and second 110*b* sets of components are operational, the method 200 comprises selecting 204 between the first 110*a* and second 110*b* sets to perform the braking function of the hydraulic braking system 100 during the scenario, with the selecting 204 based on the received scenario data 136. The method 200 comprises controlling 206 the selected set of components to perform the braking function during the scenario. Also illustrated in FIG. 2, although not essential to the method 200, are the steps of determining 208 which of the first 110*a* and second 110*b* sets is non-operational, selecting 210 the operational set of components to perform the braking function, and controlling 212 the operational set of components to perform the braking function.

The hydraulic braking system 100 and the method 200 according to the present invention thereby select which of the first 110*a* and second 110*b* sets of components are utilised to perform a braking function in a scenario where each of the first 110*a* and second 110*b* sets of components are operational. This may allow for the braking function of the hydraulic braking system 100 to be performed in a manner that is tailored to a particular scenario, by using the most appropriate set 110*a*, 110*b* of components based on the received scenario data 136.

In some embodiments, the scenario data 136 includes component data indicative of a state of components in the first 110*a* and second 110*b* sets of components, for example indicative of a state of each of the components in the first 110*a* and second 110*b* sets of components. Such component data can be indicative of any of component service life, component wear, or component performance capability. For example, where the component data is indicative of an number of actuations that have been performed out of an anticipated maximum number of actuations, the controller 101 may select one of the first 110*a* and second 110*b* sets of components to perform the braking function of the hydraulic braking system 100 to use components that are not as close to their maximum number of actuations. Similarly, for example, where the component data is indicative of component wear, the controller 101 may select one of the first 110*a* and second 110*b* sets of components to perform the braking function of the hydraulic braking system 100 to minimise component wear on components of the other of the second 110*b* and first 110*a* sets of components.

Taking the hydraulic braking system 100 illustrated in FIG. 1 as an example, it may be the case that the hydraulic pump 104 has experienced more wear than the hydraulic accumulator 106. In such an instance, the controller 101 may select to use the second set 110*b* of components to perform a braking function to avoid further wear on the hydraulic pump 104. In some embodiments, it may be the case that relatively high component performance is required, for example to provide a high braking force. Where the hydraulic pump 104 has suffered more wear than the hydraulic accumulator 106, the hydraulic accumulator 106 may be capable of higher braking performance than the hydraulic pump 104, and so, given this knowledge, the controller 101, and in particular the neural network 103, may select the second set 110*b* of components to perform the braking function.

Similarly, where the first 118 and second 120 servo valves are worn, and cannot deliver as high a braking performance as the third 122 and fourth 124 servo valves, the controller 101, and in particular the neural network 103, may, given this knowledge, select the second set 110*b* of components to perform the braking function.

The component data indicative of a state of components in the first 110*a* and second 110*b* sets of components can be indicative of a state pre-, during, or post-the scenario in which the braking function is to occur. Thus the scenario data 136 may enable the controller 101 to consider the full impact of the scenario, and the braking function to be performed in the scenario, on the components of the first 110*a* and second 110*b* sets of components.

It will of course be appreciated that there is a link between service life, wear and performance capability. For example, longer service life can be said to result in increased wear, and increased wear can be said to result in reduced performance capability. It will thus also be appreciated that wear or performance capability can be directly measured, for example using one or more sensors, or that wear or performance capability can be inferred based on service life or other parameters, such as the number of flights or landing operations. In some embodiments, wear or performance capability is inferred given other parameters such as service life. In such embodiments, the scenario data 136 may be derived from simulation data stored in a memory (not shown) of the hydraulic braking system 100.

In some embodiments, the scenario data 136 comprises data indicative of any of an aircraft condition, a runway condition, or ambient weather condition, during the scenario in which the braking function is to be performed. In such a manner the set of components selected by the controller 101 may be selected to provide performance appropriate for a given aircraft condition, runway condition, or ambient weather condition, for which the braking function is to be performed.

The aircraft condition may be indicative of any of a weight of the aircraft, landing gear loading during take-off or landing, wheel loading during take-off or landing, aircraft engine thrust magnitude, aircraft engine thrust direction, a flight control surface configuration, tyre condition, tyre pressure, or tyre lifespan. It will be appreciated by a person skilled in the art that each of the aforementioned "aircraft conditions" which occur during a particular scenario in which a braking function is to be performed may have an impact on a required braking function. For example, a heavier aircraft weight may require a larger braking force to be applied, and the controller 101, upon receipt of scenario data 136 indicating an aircraft weight, may select between the first 110a and second 110b sets of components to provide the appropriate braking force.

The runway condition may be indicative of any of runway distance or a coefficient of friction of the runway. It will be appreciated by a person skilled in the art that either of these "runway conditions" that occur in a particular scenario in which a braking function is to be performed may have an impact on a required braking function. For example, a relatively short runway may require a larger braking force to be applied, and the controller 101, upon receipt of scenario data 136, may select between the first 110a and second 110b sets of components to provide the appropriate braking force. In some embodiments, the runway condition is transmitted to the controller 101 of the hydraulic braking system 100 from an off-aircraft location. In some embodiments the runway condition is derived, at least in part, from data indicative of an ambient weather condition of an aircraft 300 in which the hydraulic braking system 100 is installed.

As another example, a relatively long, dry, runway may be indicated by the scenario data 136, and the first 110a set of components may provide braking over a shorter distance on such a runway, but the controller 101 may nevertheless select the second set of components 110b to perform a required braking function based on other scenario data 136, for example scenario data 136 indicating that one or more of the components of the first set of components 110a has suffered greater wear than the corresponding component of the second set of components 110b.

From the discussion above, it can be seen that the scenario data 136 can take a variety of forms. The neural network 103 of the controller 101 is a machine learning model, for example such as a recurrent or LSTM neural network, that has been trained to process the scenario data 136 to select between the first 110a and second 110b sets of components. A neural network typically includes a number of interconnected nodes, which may be referred to as artificial neurons, or neurons. The internal state of a neuron (sometimes referred to as an "activation" of the neuron) typically depends on an input received by the neuron. The output of the neuron then depends on the input, weight, bias, and the activation function. The output of some neurons is connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network.

The neural network 103 of the controller 101 is trained based on a high-fidelity model of the hydraulic braking system 100, which takes into consideration the mechanical and physical properties of the system 100 and its components, as well as inputs such as pressures, temperatures, flow rates etc. Using such a model, system level behaviours and effects for different scenarios that occur in use can be accounted for, and the controller 101 can utilise either of the first 110a or second 110b sets as determined to be appropriate for the given scenario. It will be appreciated that the exact form of the model on which the neural network 103 is trained will depend on the structure of the system in question, and that the structure of the model can be determined by a person skilled in the art, as appropriate.

Whilst illustrated above in the context of a particular hydraulic braking system 100, it will be appreciated that the method 200 described herein may be applicable to other types of aircraft system having first and second sets of components for separately performing the function of the aircraft system in question. It will certainly be appreciated that the method 200 described herein is not limited to hydraulic braking systems, and that other types of braking system, for example electric braking systems, that make use of the present invention are also envisaged.

Embodiments in which more than two sets of components for performing the same aircraft function are present are also envisaged. In such embodiments, the controller 101 may, where all sets of components are operational, select between the sets of components to perform the function of the hydraulic braking system 103 based on the received scenario data 136.

Figure 3:
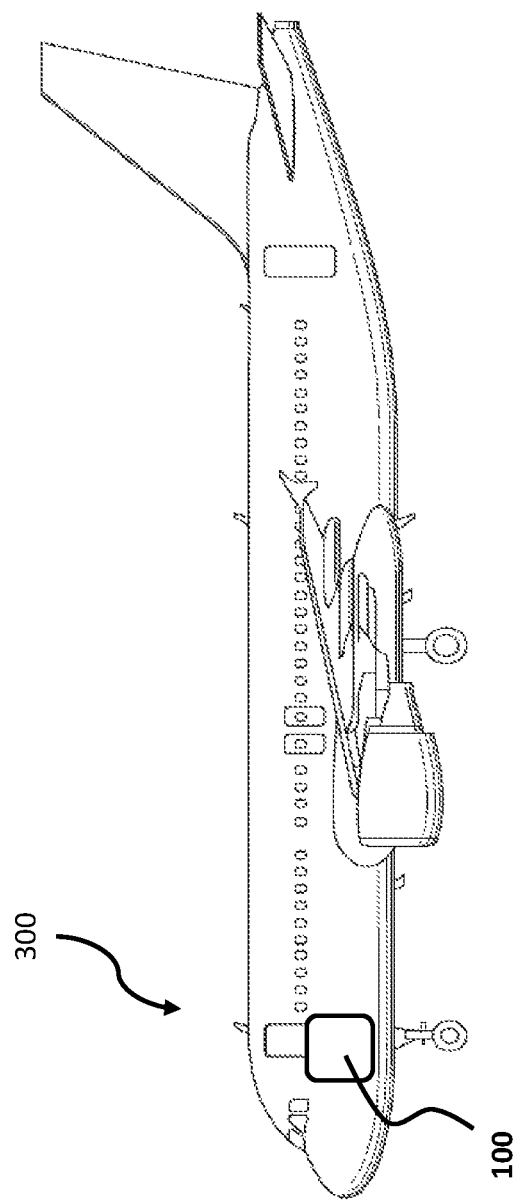
FIG. 3 is a schematic view illustrating an aircraft comprising the hydraulic braking system of FIG. 1.

An aircraft 300 comprising the hydraulic braking system 100 is illustrated schematically in FIG. 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft system comprising:
a first set of components configured to actuate a device to perform a function of the aircraft system,
a second set of components, alternative to the first set, configured to actuate the device to perform the function of the aircraft system, and
a controller comprising a machine learning model, the controller configured to:
receive scenario data indicative of a scenario during which the function of the aircraft system is to be performed, wherein the scenario is indicative of a condition of at least one of: the first or second sets of components; an aircraft which includes the aircraft system; or an environment in which the aircraft operates while the function of the aircraft system is performed;
where each of the first set of components and the second set of components are operational, select, using the machine learning model, between the first set of components or the second set of components to actuate the device to perform the aircraft system function during the scenario based on the received scenario data; and control the selected first or second set of components to actuate the device to perform the function during the scenario.

2. The aircraft system according to claim 1, wherein the scenario data comprises component data indicative of a state of components in the first set of components and the second set of components.

3. The aircraft system according to claim 1, wherein the scenario data comprises component data indicative of a state of each of the components in the first set of components and the second set of components.

4. The aircraft system according to claim 2, wherein the first set of component data and the second set of component data are indicative of any of component service life, component wear, and component performance capability.

5. The aircraft system according to claim 1, wherein the scenario data comprises data indicative of any of an aircraft condition, a runway condition, and ambient weather condition, during the scenario.

6. The aircraft system according to claim 5, wherein the aircraft system comprises an aircraft braking system, the device is a brake in the aircraft braking system, and the aircraft condition is indicative of any one or move of: a weight of the aircraft, landing gear loading during take-off or landing, wheel loading during take-off or landing, aircraft engine thrust magnitude, aircraft engine thrust direction, a flight control surface configuration, tire condition, tire pressure, or tire lifespan.

7. The aircraft system according to claim 5, wherein the aircraft system comprises an aircraft braking system, the device is a brake in the aircraft braking system, and the runway condition is indicative of any of runway distance and a coefficient of friction of the runway.

8. The aircraft system according to claim 1, wherein the aircraft system comprises a sensor, and the scenario data is derived from a reading taken by the sensor in use.

9. The aircraft system according to claim 1, wherein the aircraft system comprises a memory, and the scenario data is derived from simulation data stored in the memory.

10. The aircraft system according to claim 1, wherein the controller is configured to receive the scenario data from an off-aircraft location.

11. The aircraft system according to claim 1, wherein the first set of components and the second set of components are mutually exclusive sets.

12. An aircraft comprising the aircraft system according to claim 1.

13. The aircraft system according to claim 1, wherein the machine learning model includes a neural network trained to process scenario data.

14. A controller for an aircraft system comprising a first set of components configured to actuate a device to perform a function of the aircraft system, a second set of components, alternative to the first set, configured to actuate the device to perform the function, and a machine learning model,
wherein the controller is configured to perform the function of the aircraft system, and the controller is configured to:
receive scenario data indicative of a scenario during which the function of the aircraft system is to be performed, where each of the first set of components and the second set of components are operational,
select, using the machine learning model, the first set of components or the second set of components to actuate the device to perform the aircraft system function during the scenario based on the received scenario data; and
control the selected first set of components or the second set of components to actuate the device to perform the function during the scenario,
wherein the scenario is indicative of a condition of at least one of: the first or second sets of components; an aircraft which includes the aircraft system; or an environment in which the aircraft operates while the function of the aircraft system is performed.

15. A method of performing a function of an aircraft system comprising a first set of components configured to actuate a device in the aircraft system to perform the function and a second, set of components configured to actuate the device to perform the function, wherein the second set is an alternative to the first set, and wherein the method comprises:
receiving scenario data indicative of a scenario during which the function of the aircraft system is to be performed, while each of the first set of components and the second set of components are operational,
selecting, using a machine learning model, the first set of components or the second set of components to actuate the device to perform the aircraft system function during the scenario based on the received scenario criteria; and
controlling the selected first set of components or the second set of components to actuate the device to perform the function during the scenario,
wherein the scenario is indicative of a condition of: at least one of the first or second sets of components; an aircraft which includes the aircraft system; or an environment in which the aircraft operates while the function of the aircraft system is performed.

16. The method according to claim 15, wherein the function is actuating brakes on an aircraft, the function is performed while the aircraft is landing and is on a runway, and the scenario criteria includes at least one of runway length and a coefficient of friction of the runway.

17. An aircraft braking system comprising:
a first set of components configured to actuate an aircraft brake to perform a braking function,
a second set of components configured to actuate the aircraft brake to perform the braking function, wherein the second set is an alternative to the first set, and
a controller including a machine learning model, and the controller is configured to:
receive braking scenario data indicative of a braking scenario in which the braking function is to be performed, wherein the scenario is indicative of a condition of: at least one of the first or second sets of components; an aircraft which includes the aircraft system; or an environment in which the aircraft operates while the function of the aircraft system is performed;
where each of the first set of components and the second set of components are operational, select, using the machine learning model, the first set of components or the second set of components to actuate the brake to perform the braking function during the braking scenario based on the received braking scenario data; and
control the selected first set of components or the second set of components to actuate the brake to perform the braking function during the braking scenario.

* * * * *